United States Patent
Lee et al.

(10) Patent No.: US 8,051,431 B2
(45) Date of Patent: Nov. 1, 2011

(54) APPARATUS AND METHOD FOR INPUT MANAGEMENT

(75) Inventors: Dae-hyun Lee, Seoul (KR); Chun-un Kang, Seoul (KR); Jae-sung Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1552 days.

(21) Appl. No.: 11/020,107

(22) Filed: Dec. 27, 2004

(65) Prior Publication Data

US 2005/0160105 A1 Jul. 21, 2005

(30) Foreign Application Priority Data

Dec. 26, 2003 (KR) .................. 10-2003-0097808

(51) Int. Cl.
*G06F 13/00* (2006.01)
(52) U.S. Cl. ..................................... 719/318
(58) Field of Classification Search .................. 719/318; 710/1, 5; 706/47; 707/6; 345/156, 169; 463/36, 37; 715/716, 856
See application file for complete search history.

(56) References Cited

U.S. PATENT DOCUMENTS

| | | | |
|---|---|---|---|
| 5,471,618 A | 11/1995 | Isfeld | |
| 5,555,346 A * | 9/1996 | Gross et al. | 706/45 |
| 5,600,790 A | 2/1997 | Barnstijn et al. | |
| 5,694,150 A * | 12/1997 | Sigona et al. | 715/856 |
| 5,802,253 A * | 9/1998 | Gross et al. | 706/47 |
| 5,862,395 A * | 1/1999 | Bier | 712/1 |
| 5,941,953 A | 8/1999 | Bergmann | |
| 6,226,693 B1 * | 5/2001 | Chow et al. | 719/318 |
| 6,466,996 B1 | 10/2002 | Bonola | |
| 6,727,884 B1 * | 4/2004 | Leatham et al. | 345/156 |
| 7,116,310 B1 * | 10/2006 | Evans et al. | 345/156 |
| 2003/0005174 A1 * | 1/2003 | Coffman et al. | 709/318 |
| 2003/0051071 A1 | 3/2003 | Stefansson et al. | |
| 2004/0194115 A1 * | 9/2004 | Mogilevsky et al. | 719/318 |
| 2004/0205773 A1 * | 10/2004 | Carcido et al. | 719/318 |

FOREIGN PATENT DOCUMENTS

| | | |
|---|---|---|
| KR | 10-0221374 B1 | 6/1999 |
| KR | 10-2001-0060277 A | 7/2001 |
| KR | 2002-0068857 A | 8/2002 |

OTHER PUBLICATIONS

Communication dated Jun. 9, 2010 from the Korean Intellectual Property Office in counterpart Korean application No. 10-2003-0097808.

* cited by examiner

*Primary Examiner* — Lechi Truong
*Assistant Examiner* — Phuong N Hoang
(74) *Attorney, Agent, or Firm* — Sughrue Mion, PLLC

(57) ABSTRACT

An apparatus and a method that manage multiple inputs using a management module are disclosed. The input management apparatus and method is applied to a system that can handle an input made by at least one input device and an input made by executing at least one program. The input management apparatus according to the present invention, comprising: an event generation module, which generates a first event corresponding to the input; an input management information storing unit, which stores management information of the input; and an event management module, which, if the first event is generated, generates a second event referring to the input management information storing unit.

17 Claims, 6 Drawing Sheets

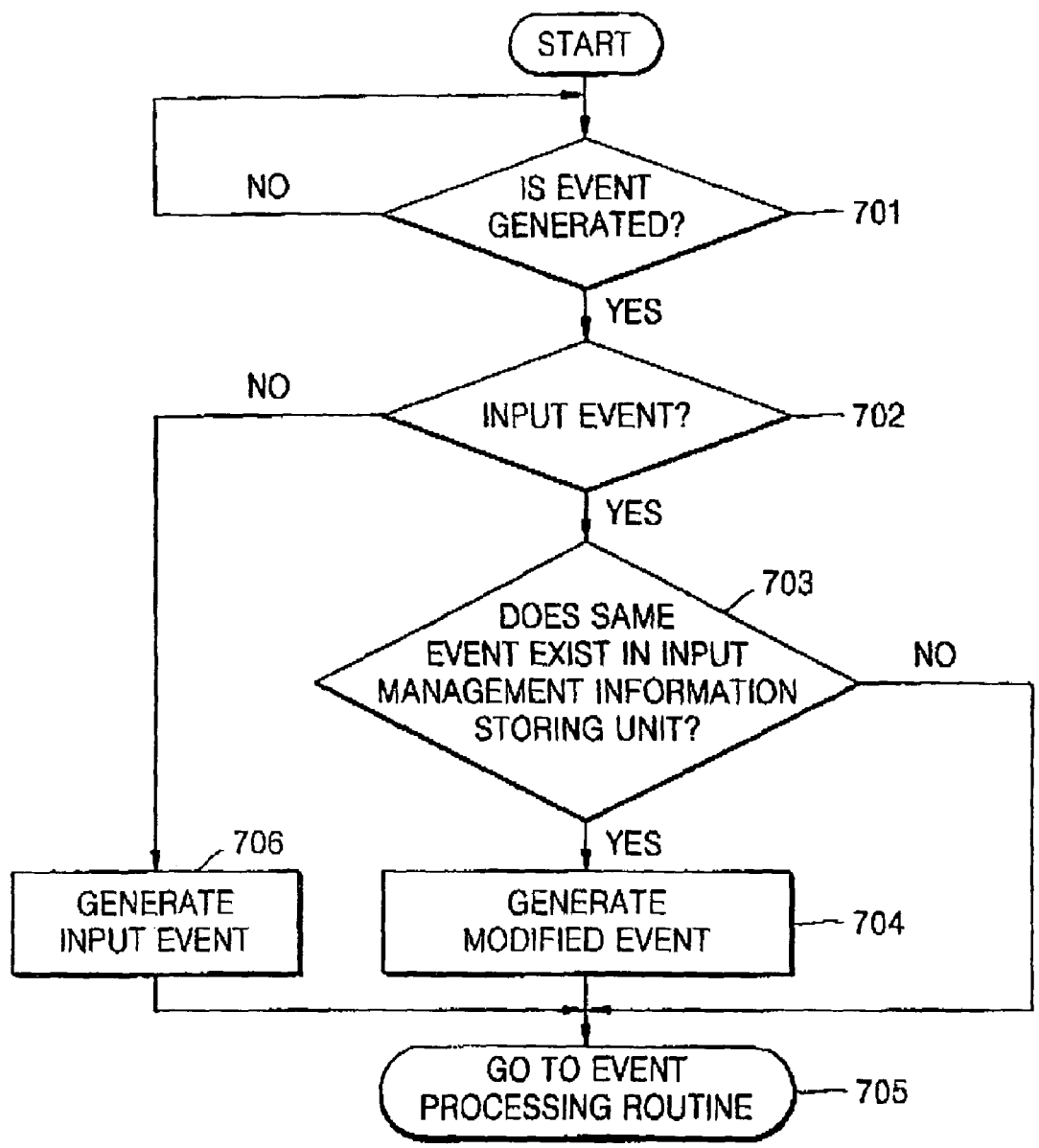

APPARATUS AND METHOD FOR INPUT MANAGEMENT

This application claims the priority from Korean Patent Application No. 2003-97808, filed on Dec. 26, 2003, in the Korean Intellectual Property Office, the disclosure of which is incorporated herein in its entirety by reference.

BACKGROUND OF THE INVENTION

1. Field of the Invention

The present invention relates to an apparatus and method for input management, and more particularly, to an apparatus and method for managing multiple inputs such as inputs made by input devices and inputs made by execution of programs.

2. Description of the Related Art

In conventional electronic devices and data processing systems such as computers, inputs are classified into key inputs made by input devices, such as a keyboard, a mouse, a remote controller, and a touch panel, and inputs made by execution of programs. The conventional electronic devices and data processing systems individually manage the inputs. That is, the conventional electronic devices and data processing systems separately manage inputs made by the input devices and execution of the programs.

Therefore, to manage all inputs made by the input devices and execution of the programs, the conventional electronic devices and data processing systems must have input management functions corresponding to each of the input devices and the programs. Accordingly, in systems having insufficient system resources, such as a set-top box and a kiosk, it is difficult for the systems to have a function capable of managing all inputs made by the input devices and the programs.

Also, in a conventional input management function, a function independently performing a limitation on an input made by each input device or each program is included. However, the conventional input management function cannot change the input made by each input device or each program to an action plan corresponding to an input made by another device or another program and cannot manage an input combining inputs made by a plurality of input devices and execution of a plurality of programs. As an example of the change in input, an action plan for an input A of a keyboard can be changed to an action plan for an input by a left click of a mouse. As an example of combining inputs, an action plan can be defined as an input combining the input A of the keyboard and the input by the left click of the mouse.

SUMMARY OF THE INVENTION

The present invention provides an apparatus and method that manage multiple inputs using a management module.

The present invention also provides an apparatus and method that manage inputs made by input devices and execution of programs on an event-by-event basis.

The present invention also provides an apparatus and method that manage inputs made by input devices and execution of programs based on input management information set by a manager.

The present invention also provides an apparatus and method that manage all inputs made by multiple input devices and execution of multiple programs in a system having limited resources.

The present invention also provides an apparatus and method that manage a combined input by combining a plurality of inputs made by a plurality of input devices and/or a plurality of inputs by the execution of a plurality of programs.

According to an aspect of the present invention, there is provided an input management apparatus that can handle an input made by at least one input device and/or an input made by executing at least one program, the apparatus comprising: an event generation module to generate a first event corresponding to the input; an input management information storing unit to store management information of the input; and an event management module to generate a second event referring to the input management information storing unit, if the first event is generated.

According to another aspect of the present invention, there is provided an input management apparatus, that can handle an input made by at least one input device and/or an input made by executing at least one program, the apparatus comprising: an event generation module, which, generates a first event corresponding to the input; an input management information storing unit, which stores management information of the input; an input management information management module, which manages the management information stored in the input management information storing unit in response to a request of a system manager; an event management module, which generates a second event referring to the input management information storing unit generated; and an event analysis module, which analyzes the first event, changes the first event, changes the first event so that a data structure is analyzable in the event management module, and outputs the changed first event, if the first event is generated.

According to another aspect of the present invention, there is provided an input management method in a system that can handle an input made by at least one input device and/or an input made by executing at least one program, the method comprising: if input event data capable of being made in the system is defined by a system manager, storing input management information based on the defined input event data; and if a first event is generated according to the input, generating a second event referring to the stored input management information.

BRIEF DESCRIPTION OF THE DRAWINGS

The above and other features and advantages of the present invention will become more apparent by describing in detail exemplary embodiments thereof with reference to the attached drawings in which:

FIG. 7 is a flowchart of a process managing a generated event in an input management method according to another exemplary embodiment of the present invention.

DETAILED DESCRIPTION OF THE ILLUSTRATIVE, NON-LIMITING EMBODIMENTS OF THE INVENTION

Figure 1:
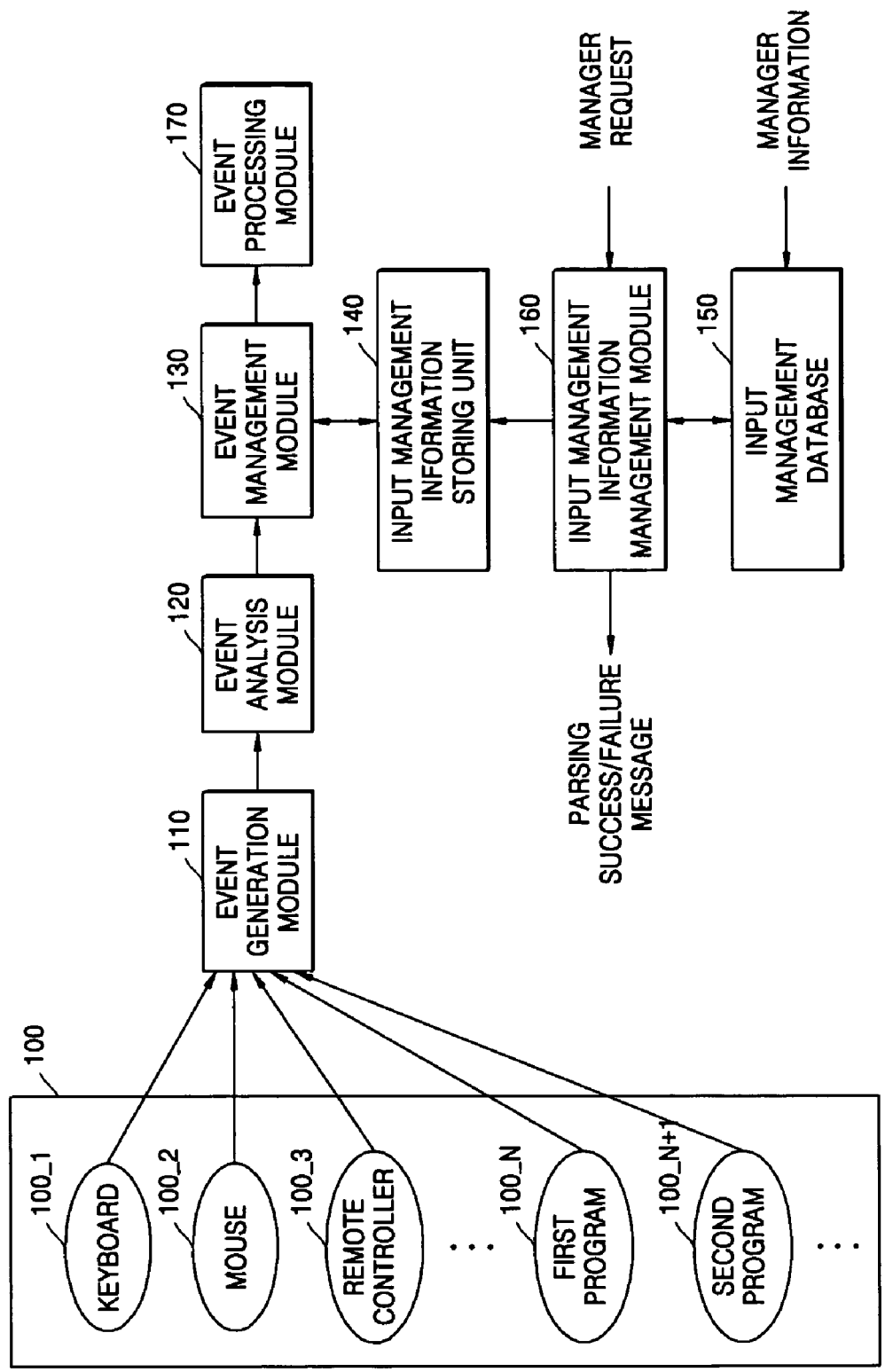
FIG. 1 is a block diagram of an input management apparatus according to an exemplary embodiment of the present invention.

FIG. 1 is a block diagram of an input management apparatus according to an exemplary embodiment of the present invention.

With reference to FIG. 1, the input management apparatus includes an input group 100, an event generation module 110, an event analysis module 120, an event management module 130, an input management information storing unit 140, an input management database 150, an input management information management module 160, and an event processing module 170.

The input group 100 includes a plurality of input devices and a plurality of executable programs. The input group 100 includes a keyboard 100_1, a mouse 100_2, a remote control 100_3, a first program 100_N, and a second program 100_N+1. The first and second programs 100_N and 100_N+1 are operated by being loaded on demand in a relevant system.

If at least one input is made by the plurality of input devices and/or the plurality of programs included in the input group 100, the input is transmitted to the event generation module 110. In the input group 100, a plurality of inputs can be made simultaneously by the plurality of input devices and/or the plurality of programs. For example, inputs can be made simultaneously by the keyboard 100_1 and the mouse 100_2.

The event generation module 110 generates an event corresponding to the received input according to a rule set in advance. The received input is a code type input. The event generation module 110 can identify a source which has supplied the received input based on the received input code. That is, the event generation module 110 can identify an input device or a program, which has supplied the received input based on the received input code. Then, the event generation module 110 recognizes an event type in the source corresponding to the received input and generates a corresponding event. The generated event can be called an input event. The input event includes an event code and an event parameter. The event parameter defines an additional input variable. For example, if a key A and a shift key of the keyboard 100_1 are simultaneously pressed, information of the shift key is defined by the event parameter.

When a plurality of inputs made by a plurality of input devices and/or a plurality of inputs made by execution of a plurality of programs are simultaneously received, the event generation module 110 can generate an input event corresponding to a result combining the received plurality of inputs. For example, if an input A of the keyboard 100_1 and an input B of the mouse 100_2 are received simultaneously, an input event can be generated based on a result combining the received inputs A and B.

The event analysis module 120 analyzes the input event generated in the event generation module 110, forms the input event so that the input event has a data structure analyzable in the event management module 130, and outputs the input event to the event management module 130. The analyzable data structure is dependent to a data structure defined in a relevant system.

If the input event is received from the event analysis module 120, the event management module 130 generates a modified event with reference to the input management information storing unit 140.

More specifically, if the input event is received from the event analysis module 120, the event management module 130 determines whether event data having the same event code and event parameter as those of the input event is stored in the input management information storing unit 140. If the event data having the same event code and event parameter is stored in the input management information storing unit 140, the event management module 130 generates a modified event. The modified event is generated based on the event data stored in the input management information storing unit 140.

Figure 2:
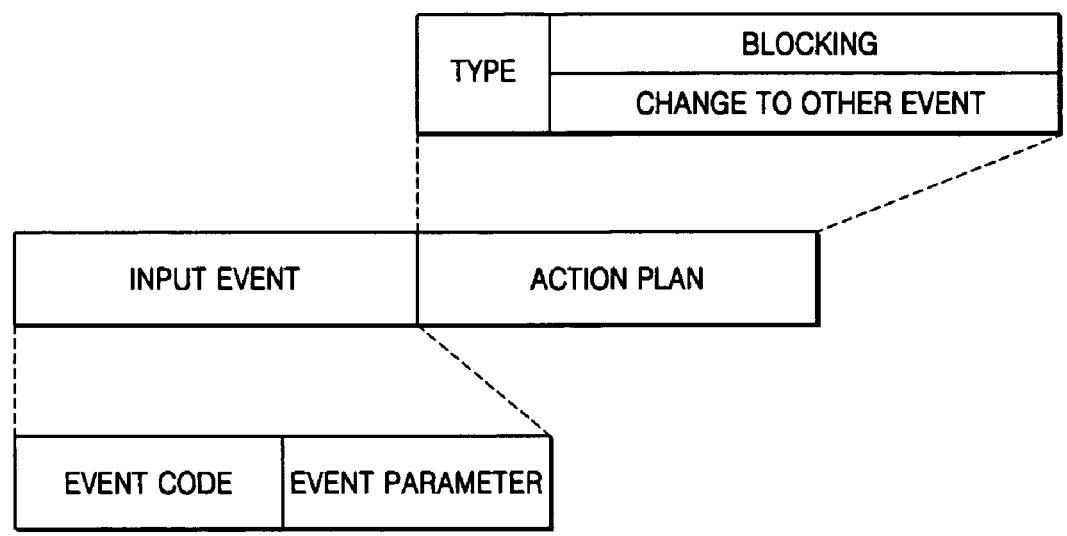
FIG. 2 is a detailed configuration of management information stored in an input management information storing unit illustrated in FIG. 1.

That is, the event information stored in the input management information storing unit 140 is divided into an input event area and an action plan area as shown in FIG. 2. An event code and an event parameter are stored in the input event area. The event code is a code that can determine an event type defined in each electronic device or each data processing system. The event parameter is an additional input parameter according to the event type defined in each data processing system or each electronic device. Type information identifying an action plan and information of an actual action plan are stored in the action plan area.

With reference to FIG. 2, information on blocking the input event and information on other events corresponding to action plans to be changed are stored in the action plan area. Blocking invalidates a relevant input event. The type information represents an action plan selected out of the action plans. If type information "1" means selection of the blocking operation against the input event, type information "0" means selection of the changing operation to change the action plan of the input event to another action plan.

If the event data stored in the input management information storing unit 140 is as described above, the modified event generated in the event management module 130 is generated based on the actual action plan information recorded in the action plan area.

However, if an event data having the same event code and event parameter is not stored in the input management information storing unit 140, the event management module 130 outputs the received input event.

Figure 3:
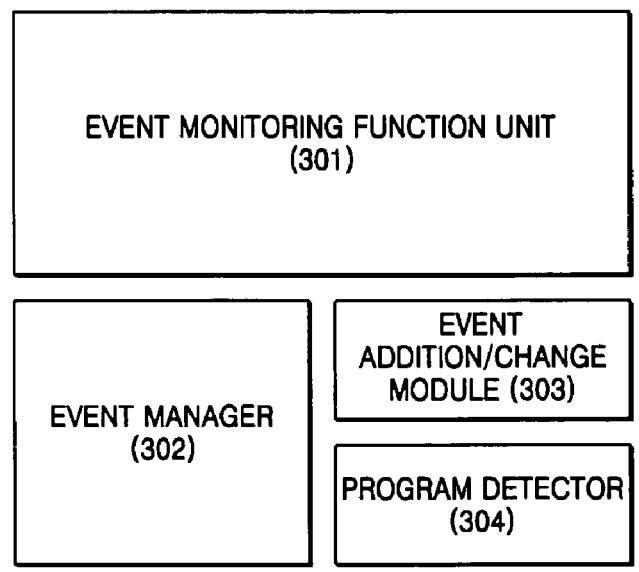
FIG. 3 is a detailed configuration of an event management module illustrated in FIG. 1.

With reference to FIG. 3, the event management module 130 includes an event monitoring function unit 301, an event manager 302, an event addition/change module 303, and a program detector 304.

The event monitoring function unit 301 monitors whether an input event is generated and outputs the monitoring result to the event manager 302. If the event manager 302 receives information notifying an event generation from the event monitoring function unit 301, the event manager 302 manages the input event so that an operation corresponding to the generated event can be performed according to a condition set by a manager.

The event addition/change module 303 determines whether the input event is handled as an event according to a condition set by the manager. To make the above determination, the event addition/change module 303 refers to the input management information storing unit 140 on the basis of event codes and event parameters of the input event. If the same event code and event parameter exist in the input management information storing unit 140, the event addition/change module 303 reads action plan information stored in the input management information storing unit 140 and outputs the action plan information to the event manager 302 so that an operation corresponding to the input event follows the action plan stored in the input management information storing unit 140.

The program detector 304 detects a program to which the input event or the event modified by the event addition/change module 303 is transferred. That is, the program detector 304 detects a program executing a code area performed in the relevant system as the program to which the input event or the modified event is transferred. The detection result is output to the event manager 302.

The event manager 302 selectively generates the modified event or the input event based on the information received from the event addition/change module 303 and defines an object, to which the generated event is transferred, based on the information received from the program detector 304.

The input management information storing unit 140 is updated based on the information stored in the input management database 150 managed by the manager.

In the input management database 150, definition data of an event for a defined input and an event for an undefined input is recorded. The defined input is defined in the system in advance as being inputs which can be generated by the input devices and inputs which can be generated by the execution of programs. The undefined input is a manufactured input not defined in the system. The manager inputs the definition data of the event based on a basic input format.

If the basic input format is defined so that information of comments, commands, and data is input by limiting one line to one input in principle with "#" used as a first character for stating a comment, "!" used as the first character for stating a command, and any other characters except "#" or "!" used as the first character for stating data, the manager inputs the definition data of the input event according to the basic input format.

When the manager inputs the definition data, the manager can use a phrase defining an event type, a phrase defined by a defined method, and a phrase defining an action taking the event or can directly write event definition data.

The input management database 150 is formed by the data input based on the definition method of the input event. The event definition data stored in the input management database 150 is text file type data.

The input management information management module 160 reads and parses the event definition data stored in the input management database 150 whenever the manager requests. As the result of parsing, the input management information management module 160 updates the input management information storing unit 140.

Figure 4:
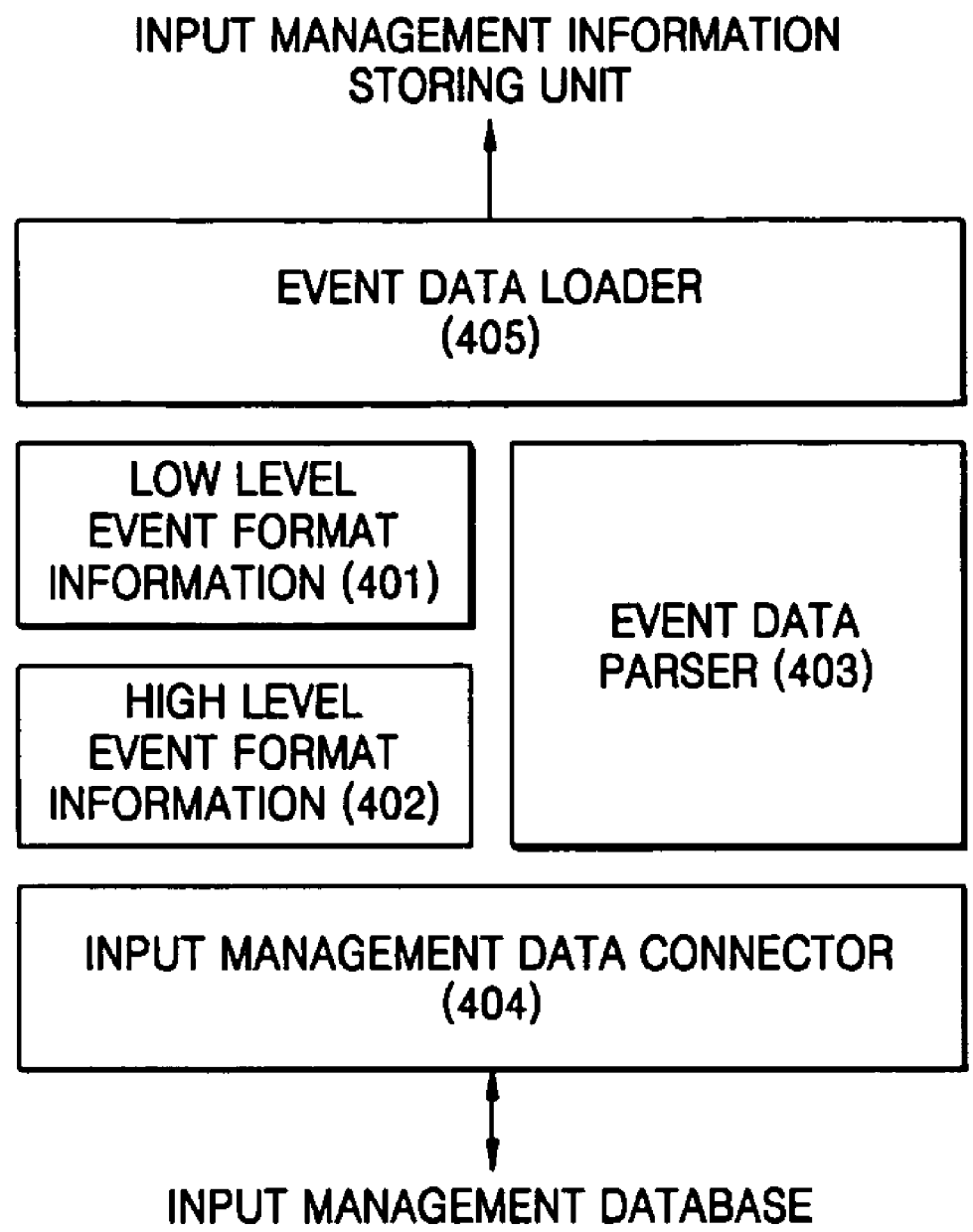
FIG. 4 is a detailed configuration of an input management information management module illustrated in FIG. 1.

With reference to FIG. 4, the input management information management module 160 includes a low level event format information 401, a high level event format information 402, an event data parser 403, an input management data connector 404, and an event data loader 405.

The low level event format information 401 defines format information of an event classified as a low level event. The low level event category is for the undefined input.

The high level event format information 402 defines format information of an event classified as a high level event. The high level event category is for the already defined input.

The event data parser 403, if the request information is received from the manager, reads the event definition data by lines from the input management database 150 via the input management data connector 404. Also, the event data parser 403 parses the read event definition data by referring to the low level event format information 401 if the read event definition data is a low level event and the high level event format information 402 if the read event definition data is a high level event.

If parsing fails, the event data parser 403 outputs a parsing failure message so that the manager can recognize the parsing failure. If the read event definition data is invalid, parsing fails. On the contrary, if the read event definition data is valid and the data is read to the end, the event data parser 403 outputs a parsing success message so that the manager can recognize the success in parsing.

The event data parser 403 loads the parsed data into the input management information storing unit 140 via the event data loader 405. Accordingly, the information stored in the input management information storing unit 140 is updated.

The input management data connector 404, if the request information is received from the manager, is controlled by the event data parser 403 and connected to the input management database 150, and reads the event definition data stored in the input management database 150 on a line-by-line basis.

The event data loader 405, if parsing of the event definition data is successful in the event data parser 403, updates the data stored in the input management information storing unit 140 by loading the parsed event definition data into the input management information storing unit 140.

The event processing module 170 analyzes the input event or the modified event generated in the event management module 130 so that a suitable operation is performed in the system.

Figure 5:
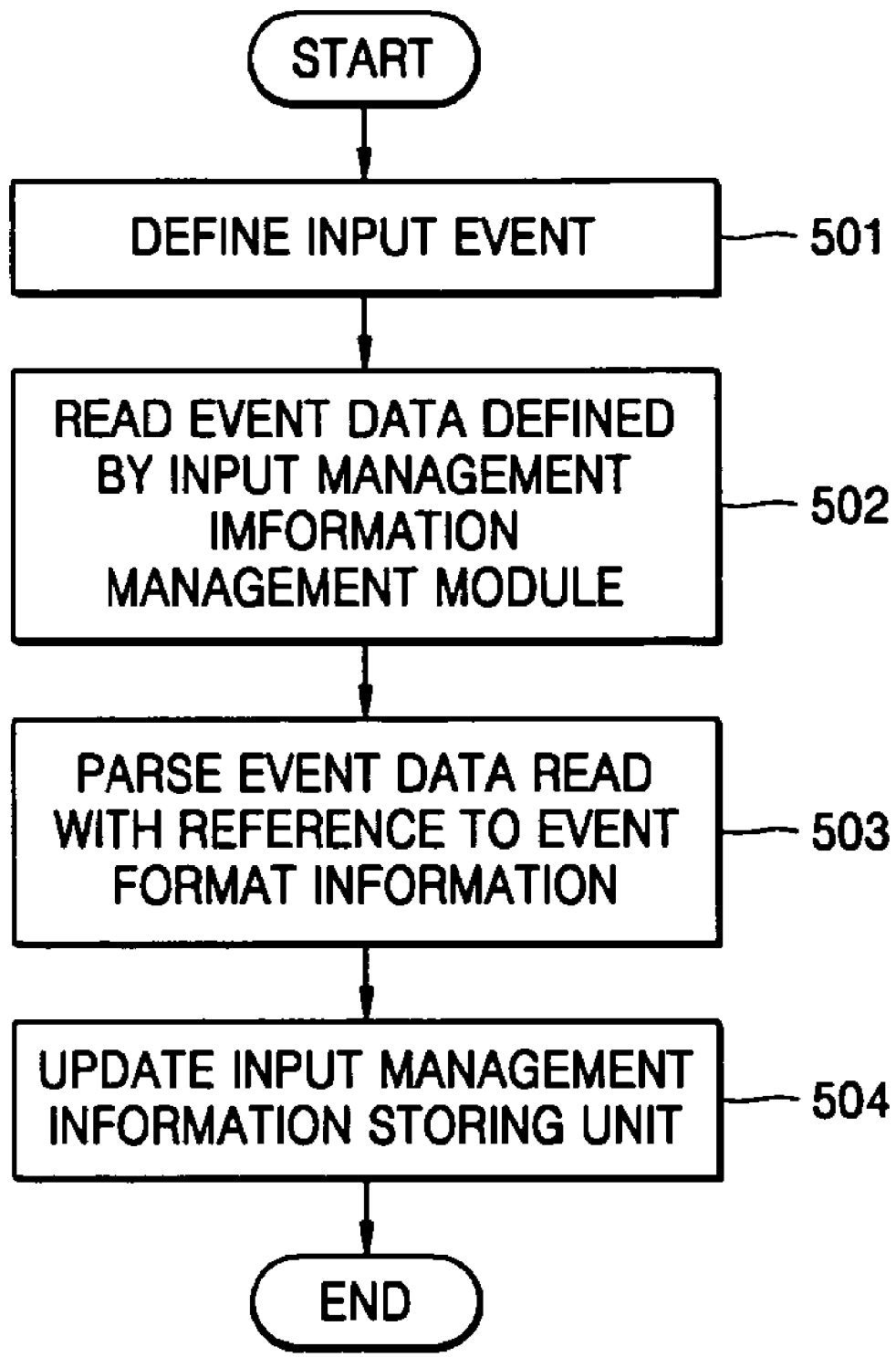
FIG. 5 is a flowchart of a process updating the input management information storing unit in an input management method according to an another exemplary embodiment of the present invention.

FIG. 5 is a flowchart of a process of updating the input management information storing unit 140 in an input management method according to an another exemplary embodiment of the present invention.

In operation 501, input events are defined by a manager. The input events include events for defined inputs and events for undefined inputs. The events are defined based on the basic input format as illustrated in the description of the input management database 150 of FIG. 1.

In operation 502, event data defined by the input management information management module 160 is read.

In operation 503, the read data is parsed with reference to event format information. That is, if the read event is a low level event, the read data is parsed with reference to the low level event format information. If the read event is a high level event, the read data is parsed with reference to the high level event format information. The low level event category is for the undefined input and the high level event category is for the defined input.

In operation 504, the data stored in the input management information storing unit 140 is updated based on the parsed data.

Figure 6:
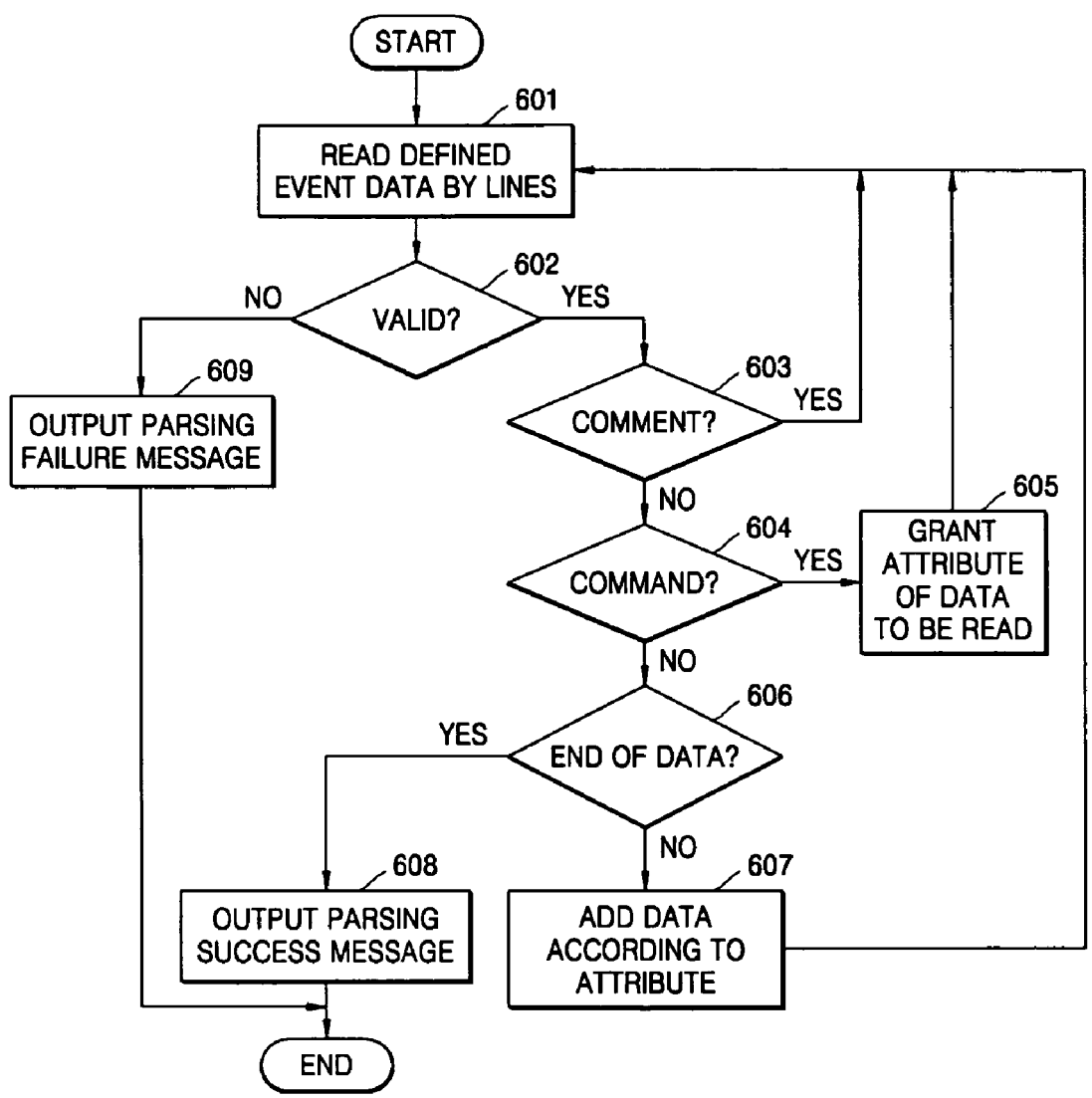
FIG. 6 is a detailed flowchart of an event data read operation and a parsing operation illustrated in FIG. 5.

FIG. 6 is a detailed flowchart of the event data read operation and the parsing operation defined in FIG. 5.

In operation 601, the defined event data is read on a line-by-line basis.

In operation 602, whether the read event data is valid is determined. If it is determined that the read event data is valid in operation 602, it is determined whether the read event data is a comment in operation 603. If it is determined that the read event data is a comment in operation 603, the defined event data is read on a line-by-line basis by returning to operation 601.

If it is determined that the read event data is not a comment in operation 603, whether the read event data is a command is determined in operation 604. If it is determined that the read event data is a command in operation 604, an attribute of the event data to be read is granted in operation 605 and the defined event data of a next line is read by returning to operation 601.

If it is determined that the read event data is not a command in operation 604, whether the read event data is end data of the event data is determined in operation 606. If the read event data is not the end data of the event data in operation 606, the read event data according to the attribute of the event data is added and the defined event data of a next line is read by returning to operation 601.

If the read event data is the end data of the event data in operation 606, an event data parsing success message is output in operation 608 and the process is terminated.

If it is determined that the read event data is invalid in operation 602, a parsing failure message is output in operation 609 and the process is terminated.

FIG. 7 is a flowchart of a process of managing a generated event in an input management method according to the another exemplary embodiment of the present invention.

If it is determined that an event is generated in operation 701, whether the event is an input event is determined in operation 702. If it is determined that the event is an input event in operation 702, whether the same event as the input event exists in the input management information storing unit 140 is determined in operation 703.

If it is determined that the same event as the input event exists in the input management information storing unit 140 in operation 703, a modified event is generated in operation 704. The modified event is generated based on the information stored in the input management information storing unit 140. The process goes to an event processing routine in operation 705. Accordingly, an action plan for the input event is changed according to the modified event. An action plan can block a relevant input event or be changed to another action plan. Accordingly, a keyboard event A can be changed to a mouse event B. As described above, an input event can be ignored or modified.

If it is determined that the same event as the input event does not exist in the input management information storing unit 140 in operation 703, the process goes to the event processing routine in operation 705 and the action plan corresponding to the input event can perform.

As described above, since the present invention manage inputs using one management module, resources can efficiently managed in a system having limited system resources, such as a set-top box and a kiosk.

Also, according to the present invention, a system manager can enable only necessary inputs according to a user. That is, since a system manager can define a frequently used function so as to easily use or can minimize unnecessary inputs, user convenience increases and an improper operation of the system due to an incorrect input can be prevented.

Since the present invention can block inputs mainly used for executing an unauthorized program or illegally accessing a system, access to the system for reverse engineering or hacking can be prevented.

Furthermore, since the present invention can process an input event so that a plurality of inputs of a plurality of different input devices can be handled as one input event, the input event can be modified into various types.

Since a manager can modify or add an input event by inputting definition data for the input event, the manager does not have to develop or add additional hardware in order to modify or add an input event and can easily and continuously offer more efficient input methods to a user.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An input management apparatus which manages a plurality of inputs made by a plurality of input devices or by executing a plurality of programs, the apparatus comprising:
    a processor;
    an event generation module, implemented on the processor, which generates a first event corresponding to the plurality of inputs;
    an input management information storing unit which stores input management information; and
    an event management module which receives the first event and generates a second event based on the input management information stored in the input management information storing unit;
    wherein the plurality of inputs are handled as one input event,
    wherein the input management information comprises management information of an event for a defined input and an event for an undefined input made by the input device or by executing the program,
    wherein the undefined input is a manufactured input which is not defined and definition data of the undefined input is input by a user.

2. The apparatus of claim 1, wherein the input management information is updated by a system manager.

3. The apparatus of claim 1, wherein the event management module generates the second event based on the input management information stored in the input management information storing unit if it is determined that modification of an action plan for the first event is necessary based on the input management information stored in the input management information storing unit.

4. The apparatus of claim 3, wherein if it is determined that modification of an action plan for the first event is unnecessary based on the input management information stored in the input management information storing unit, the event management module outputs the first event without generating the second event.

5. The apparatus of claim 3, wherein if identification information of the first event is the same as identification information included in the input management information stored in the input management information storing unit, the event management module determines that modification of an action plan for the first event is necessary.

6. The apparatus of claim 1, wherein if a plurality of inputs are made simultaneously, the event generation module generates the first event based by combining the simultaneous inputs.

7. The apparatus of claim 1, wherein the event management module detects a program to which one of the first event and the second event is transferred.

8. The apparatus according to claim 1, wherein the input management information comprises input event information including an event code and an event parameter and action plan information including a type of action plan.

9. The apparatus according to claim 8, wherein the type of action plan comprises at least one of blocking the input event and changing the action plan.

10. The apparatus according to claim 1, wherein the defined input is defined in advance as being an input which can be generated by the plurality of input devices.

11. An input management apparatus which manages a plurality of inputs made by a plurality of input devices or by executing a plurality of programs, the apparatus comprising:
    a processor;
    an event generation module, implemented on the processor, which generates a first event corresponding to the plurality of inputs;
    an input management information storing unit which stores input management information;
    an input management information management module which manages the input management information stored in the input management information storing unit in response to a request of a system manager;
    an event analysis module which analyzes the first event, modifies a data structure of the first event, and outputs the first event having the modified data structure; and
    an event management module which receives the first event output from the event analysis module and generates a second event based on the input management information stored in the input management information storing unit;

wherein the plurality of inputs are handled as one input event, wherein the input management information management module classifies an input event into an event for a defined input and an event for an undefined input, and manages the input event, wherein the undefined input is a manufactured input which is not defined and definition data of the undefined input is input by a user.

12. The apparatus according to claim 11, wherein the input management information management module comprises low level event format information for the undefined input and high level event format information for the defined input.

13. An input management method in a system which manages a plurality of inputs made by a plurality of input devices or by executing a plurality of programs, the method comprising:

generating a first event corresponding to the plurality of inputs ;

storing input management information based on input event data defined by a system manager; and generating a second event based on the stored input management information if the first event is generated according to the plurality of inputs;

wherein the plurality of inputs are handled as one input event, wherein the input event data comprises an event for a defined input and an event for an undefined input made by the input device or by executing the program, wherein the undefined input is a manufactured input which is not defined and definition data of the undefined input is input by a user.

14. The method of claim 13 wherein the second event is generated if it is determined that modification of an action plan for the first event is necessary.

15. The method of claim 13, further comprising outputting the first event as an event corresponding to the current input if it is determined that modification of an action plan for the first event is unnecessary based on the stored input management information.

16. The method of claim 13, wherein if a plurality of inputs are made simultaneously, the first event is generated by combining the simultaneous inputs.

17. The method of claim 13, further comprising updating the input management information according to a request of a manager.

* * * * *